United States Patent
Ross, Jr. et al.

(10) Patent No.: US 8,743,421 B1
(45) Date of Patent: Jun. 3, 2014

(54) SYSTEM AND METHOD FOR SPOT COLOR CORRECTION

(75) Inventors: Robert Clifford Ross, Jr., Fairhope, AL (US); Kenneth Orin Parker, Theodore, AL (US); Thomas Howard Deck, Mobile, AL (US)

(73) Assignee: Xante Corporation, Mobile, AL (US)

( * ) Notice: Subject to any disclaimer, the term of this patent is extended or adjusted under 35 U.S.C. 154(b) by 37 days.

(21) Appl. No.: 13/549,502

(22) Filed: Jul. 15, 2012

Related U.S. Application Data

(60) Provisional application No. 61/509,079, filed on Jul. 18, 2011.

(51) Int. Cl.
*H04N 1/60* (2006.01)

(52) U.S. Cl.
USPC .............................. 358/1.9; 358/504; 358/518

(58) Field of Classification Search
None
See application file for complete search history.

(56) References Cited

U.S. PATENT DOCUMENTS

| | | | |
|---|---|---|---|
| 6,295,133 B1 | 9/2001 | Bloomquist et al. | |
| 6,378,983 B1 | 4/2002 | Ito et al. | |
| 6,380,951 B1 | 4/2002 | Petchenkine et al. | |
| 6,381,036 B1 * | 4/2002 | Olson | 358/1.9 |
| 6,411,396 B1 | 6/2002 | Benson et al. | |
| 6,483,524 B1 | 11/2002 | Petchenkine et al. | |
| 7,054,034 B2 * | 5/2006 | Underwood et al. | 358/1.9 |
| 7,298,526 B2 * | 11/2007 | Bailey | 358/1.9 |
| 7,433,103 B2 * | 10/2008 | Edge | 358/518 |
| 7,900,144 B1 * | 3/2011 | Edge et al. | 715/276 |
| 7,920,292 B2 * | 4/2011 | Stevens | 358/3.01 |
| 7,961,321 B2 * | 6/2011 | Bonikowski et al. | 356/402 |
| 8,072,646 B2 * | 12/2011 | Mestha et al. | 358/1.9 |
| 8,164,766 B2 * | 4/2012 | van De Capelle et al. | 358/1.13 |
| 8,456,697 B2 * | 6/2013 | Mestha et al. | 358/1.9 |
| 2002/0008880 A1 * | 1/2002 | Dewitte et al. | 358/1.9 |
| 2007/0002342 A1 * | 1/2007 | Morales et al. | 358/1.9 |
| 2008/0043263 A1 * | 2/2008 | Hancock et al. | 358/1.9 |
| 2008/0079977 A1 * | 4/2008 | van de Capelle et al. | 358/1.13 |
| 2008/0130022 A1 * | 6/2008 | Dalal et al. | 358/1.9 |
| 2008/0144054 A1 * | 6/2008 | Van de Capelle et al. | 358/1.9 |
| 2008/0259401 A1 * | 10/2008 | Farrell et al. | 358/2.1 |
| 2010/0045987 A1 * | 2/2010 | Bonikowski et al. | 356/402 |
| 2010/0085587 A1 * | 4/2010 | Hayward et al. | 358/1.9 |
| 2011/0235141 A1 * | 9/2011 | Shestak et al. | 358/504 |
| 2013/0088728 A1 * | 4/2013 | Chen et al. | 358/1.9 |

OTHER PUBLICATIONS iQueue Data Sheet (May 2012, Mobile, Alabama).

* cited by examiner

*Primary Examiner* — Dung Tran
(74) *Attorney, Agent, or Firm* — The Gache Law Firm, P.C.; Russell C. Gache

(57) ABSTRACT

A system and method for matching spot colors in a PDL document with actual printed output is disclosed. A pre-press workflow application identifies spot colors in a PDL document and creates a table of potential substitute color tiles, each having color characteristics similar to the original spot color. These tiles are then printed in a "swatch page" of numerically assigned colors and reviewed by the user for potential selection over the original spot color values. A substitute color may then be selected from the swatch page and the pre-assigned numerical value for the selected color tile input into the workflow application. The PDL document is then altered to record the color change. The resulting printed document more closely matches the desired spot color and the process can be repeated for any print environment to allow for more consistent printing results and lower print job costs.

30 Claims, 5 Drawing Sheets
(2 of 5 Drawing Sheet(s) Filed in Color)

PRIOR ART FIG. 1

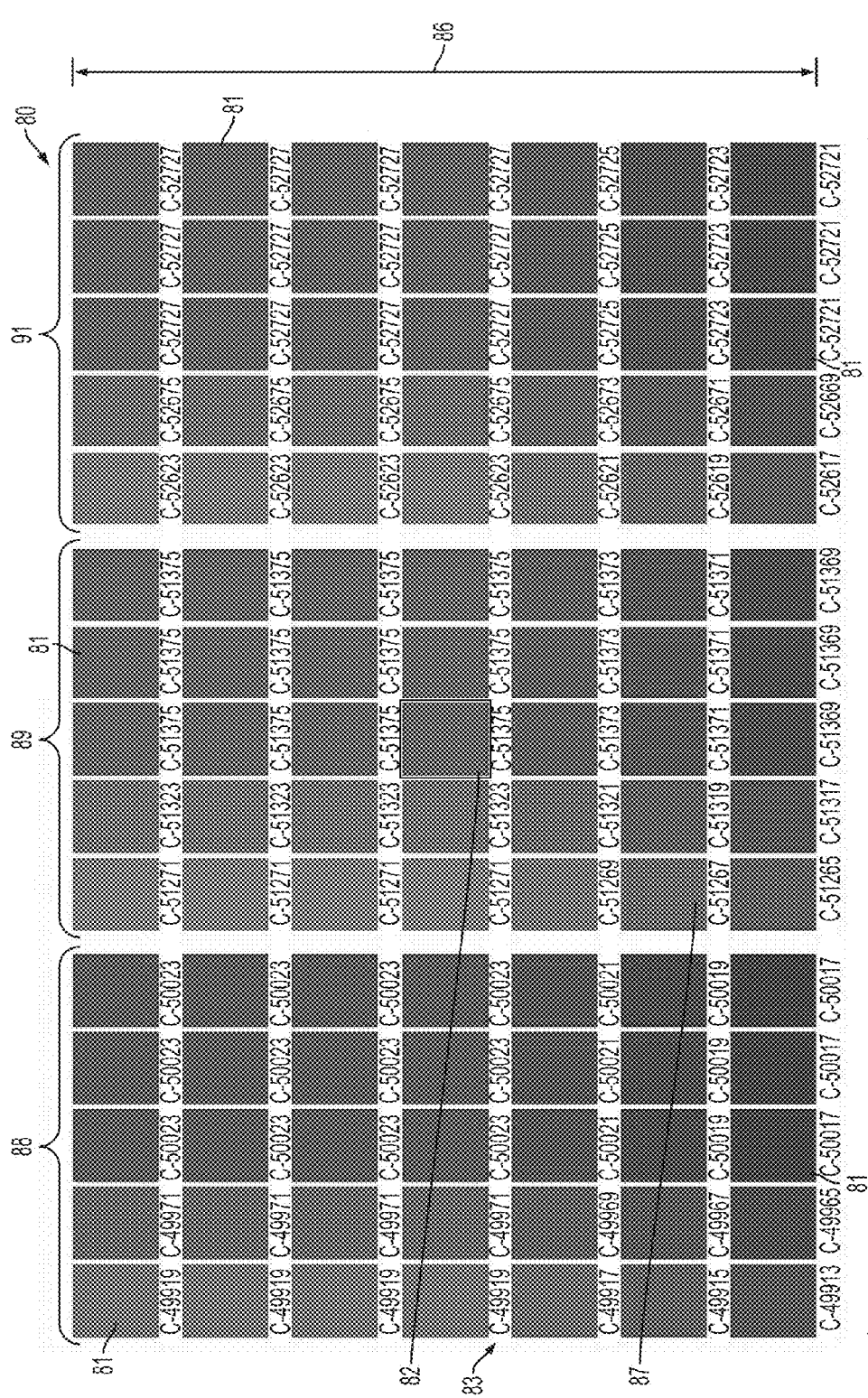

SYSTEM AND METHOD FOR SPOT COLOR CORRECTION

This application claims the benefit of filing priority under 35 U.S.C. §119 and 37 C.F.R. §1.78 of the U.S. Provisional Application Ser. No. 61/509,079 filed Jul. 18, 2011, for a Software Application for Digital Document Spot Color Correction. All information disclosed in that prior pending provisional application is incorporated herein by reference.

FIELD OF THE INVENTION

The present invention relates generally to printer file manipulation. In particular, the invention relates to utilizing workflow prepress systems to correct spot color inaccuracies. In even greater particularity, the present invention relates to using test printing swatches to correct color expectations for spot colors in a printed document.

BACKGROUND OF THE INVENTION

Automated prepress workflow systems have changed the way prepress operations occur by performing a variety of prepress operations in a digitized file with a computer system. In the past, manually altering physical documents or document representations was the norm. Modern workflow systems are now implemented in software and can perform a greater variety of operations on a digital document prior to producing it with a printing device. For example, a prepress workflow system may scale, rotate or otherwise manipulate an image that is included in a document, format text into a particular font, size, color, language or orientation, or the like. However, as document preparation software applications have become more sophisticated, workflow software systems have focused increasingly on managing printing efficiencies so that the cost of printing a document may be known ahead of executing a print job. This also allows for the estimation of the cost of a prepress workflow and printing operation to be known so that a profitable business model may be realized. This is especially important for color print jobs that use relatively expensive color inks and toners. Such workflow efficiencies have, by and large, allowed for the successful advent of digital print shops. Example prepress workflow or workflow related systems include those described in U.S. Pat. No. 6,295,133 to Bloomquist et al; U.S. Pat. No. 6,378,983 to Ito et al; U.S. Pat. No. 6,380,951 to Petchenkine et al, U.S. Pat. No. 6,411,396 to Benson et al; and U.S. Pat. No. 6,483,524 to Petchenkine et al, each of which is hereby incorporated by reference.

Page description language ("PDL") based documents use languages such as Printer Command Language ("PCL"), PostScript ("PS"), and Portable Document Format ("PDF") to control how PDL documents are printed on a printing device. In order to produce a finished sheet, the printing device interprets the data contained in the PDL file, renders objects within the data into bitmaps, and after all objects for the sheet are rendered, prints the sheet. Typically, the printing device includes a raster image processor or "RIP" that renders objects within the PDL file into bitmaps which are transferred to a print engine within the printing device. The print engine then renders the image onto some form of output media.

Workflow systems take advantage of the above described printing process in a PDL file by allowing operations to be performed on the PDL document just prior to printing (i.e. "pre-press"), such as, soft-proofing (i.e., displaying an exemplary digital rendering of one or more pages of a PDL document on a computer screen, display or other image-based system), adjusting the Pill file for various types of print media, controlling the printing output device to which a PDL document will be output, controlling the time and priority of pending printing jobs, arranging various pages in a PDL file to achieve a proper sequence or position of each page relative to other pages (herein referred to as "imposition" or "imposition processing"), and correcting colors so that the printed colors closely match computer display colors for the document prior to the document being submitted to a printing device for printing.

However, faithful reproduction of colors has always been a focus and challenge to the print industry. As is known, each reproduction device has its own color space, or "gamut" within which it can reproduce colors. When an image moves from one device to another, image colors may change because each device interprets color values according to its own color space. For example, it is impossible for all the colors viewed on a monitor to be identically matched in a printed output from a desktop printer. A printer operates in a cyan, magenta, yellow, and key (i.e. black) (hereinafter "CMYK") color space, and a monitor operates in a red, green, blue (hereinafter "RGB") color space. Their "gamuts" are different. Some colors produced by inks cannot be displayed on a monitor, and some colors that can be displayed on a monitor cannot be reproduced using inks on paper. Hence, the physical reality of color reproduction between computer systems, between ink based printing devices, and between color laser devices is greatly complicated. Nevertheless, workflow systems are designed to attempt to compensate for such physical differences.

Within any color PDL document, some colored sections in the document may use a color selected by the document creator called a "spot color." A spot color is any color generated by an ink that is printed using a single pass or run through a printing device. The color can be any color, even non-standard offset colors such as metallic, fluorescent, or preprocessed colors. There are various methods to incorporate sophisticated patterns of spot colors in a final prepress work, and many software applications such as Adobe InDesign, Adobe Illustrator, and QuarkXPress can generate spot colors as additional "channels" in a PDL document to attempt to maintain consistency of printed document output. Some applications can also utilize spot colors in special layered printing effects such as feathered edges or dissolve effects.

For print devices that do not use special inks, the only option to reproduce a PDL document that calls for a spot color is to attempt to reproduce that color using a "process color." In other words, the printer attempts to reproduce the spot color with a combination of colors in accordance with processing instructions built into the printer. However, the matching of color output of a spot color in a PDL document with printing devices that cannot provide the special ink of a spot color is complicated and troublesome, even beyond the technical differences in gamut between a computer monitor and a familiar printing device. And, quite often, the finished output of a document printed on a printing device will vary depending on a number of shifting variables, such as, for example, environmental influences like temperature, humidity, and elevation, variations in output media, and differences in toner or ink sources—all potentially leading to unsatisfactory print results. Added to these factors is the complexity that in most cases digital documents such as a PDF digital document print with different colors than what its creator viewed on a computer monitor. As mentioned above, this variation in color is due to the inherently different technologies used in representing color on computer monitors versus a printer. Because of the differences in how colors are shown, and because of the above described printing variances, no direct mathematical correlation exists between colors as presented on a computer monitor and colors printed through a print device.

Therefore, what is needed is a pre-process system for correcting spot colors in a PDL document so that the color output of a computer display and the color output of a printed device would be better matched, and so that the printed result would yield a consistently satisfactory color document.

SUMMARY OF THE INVENTION

In summary, the invention is a system and process for matching spot colors in a PDL document by using a pre-press workflow application to identify spot colors in a PDL document, creating a table of potential substitute color tiles, printing a "swatch page" of those tiles in a numerical format, and selecting a substitute color for a particular spot color using a pre-assigned numerical value for each color tile. The PDL document is then altered to record the color changes. The resulting printed document more closely matches the desired spot color and the process can be repeated for any print environment to allow for more consistent printing results and lower printing costs. Other features and objects and advantages of the present invention will become apparent from a reading of the following description as well as a study of the appended drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A system and method for spot color correction incorporating the features of the invention is depicted in the attached drawings which form a portion of the disclosure and wherein.

DESCRIPTION OF THE PREFERRED EMBODIMENTS

Figure 1:
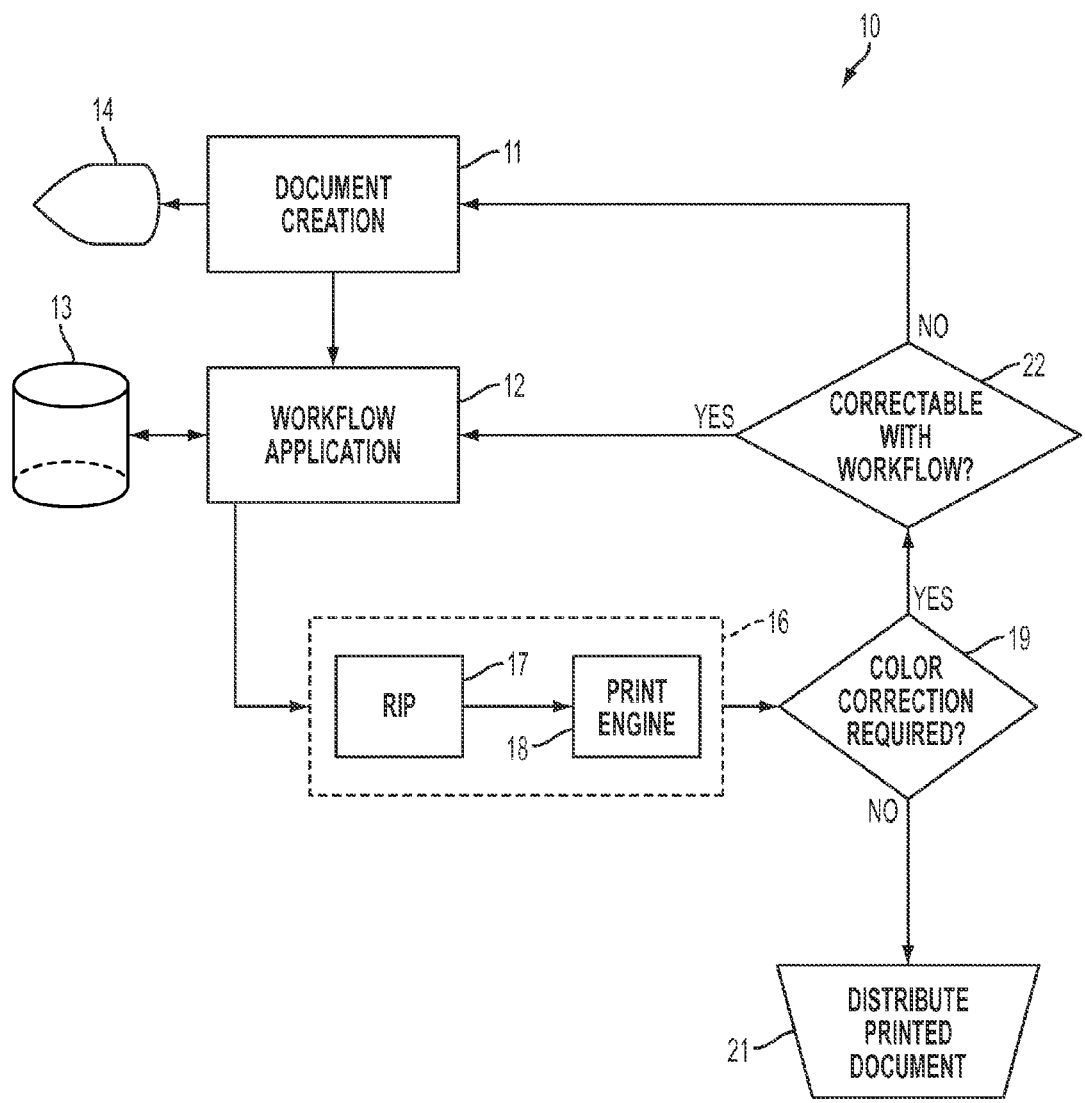
FIG. 1 is the prior art process for correcting the color document printouts.

Referring to the drawings for a better understanding of the function and structure of the invention, FIG. 1 shows the prior art process 10 for using a workflow software application to alter how a document is printed. Initially, a document is created 11 using a document creation application on a computer work station, such as a personal computer ("PC") or graphics workstation. Such applications are commonplace and economical, such as a word processing application or a graphical artist or desktop publishing application like InDesign®. The author of the document reviews the document on whatever display system 14 is connected to the PC and changes to colors in the document are made to the satisfaction of the user based upon the display results. The document is then "printed" by the user of the PC.

However, in a workflow printing environment, the printer selected for output by the document creation application is a virtual printer integrated with a workflow software application 12 that has express control over all print jobs printed or sent to the workflow virtual printer. Workflow programs 14 such as iQueue™ produced by Xante Corporation, allow for independent control of all print jobs in a designated workflow environment, and also allow for known prepress management of workflow documents, such as CMYK density adjustments and imposition management. Print jobs, whether altered or unaltered by the workflow application are saved in memory, such as a high-capacity hard drive attached to various PCs via a local network 13, or a cloud based server (not shown). A datasheet explaining the prepress capabilities of iQueue is hereby incorporated by reference. Additional explanation regarding the general workings of a workflow application is omitted as such applications are well known in the industry and further explanation of their workings is unnecessary for a complete understanding of the herein described invention.

In order for a workflow application to have fuller control over how a document is printed, most workflow virtual printers create a type of interim print file utilizing a page description language or PDL, such as well-known languages like PostScript or PCL. For the purposes of the current disclosure, examples shall be provided using the PS language, but any PDL document utilizing any printer language may be utilized for the herein described invention.

As shown, workflow application 12 sends a PS file over the local network or other network topology to printing device 16 where a raster input processor or "RIP" 17 creates image bitmaps. These bitmaps are transferred to a print engine 18 within the printing device for printing onto output media. If correction to the printed output is required 19, such as if the color of a simulated spot color is less than satisfactory, an attempt to correct the PDL through the workflow application may be made 22 and reprinted through the workflow application 12. If it cannot be corrected with the workflow application, further editing of the document 11 may be required to attempt to adjust colors further, and reprinted again. These steps are iterated until further color correction is unnecessary 19 and a printed document is ready for distribution 21.

However, the prior art process can be frustrating because this correction process is essentially a dual path, trail-and-error procedure, leading to wasted ink and media, and leading to unpredictable results of spot color simulated reproduction.

Figure 2:
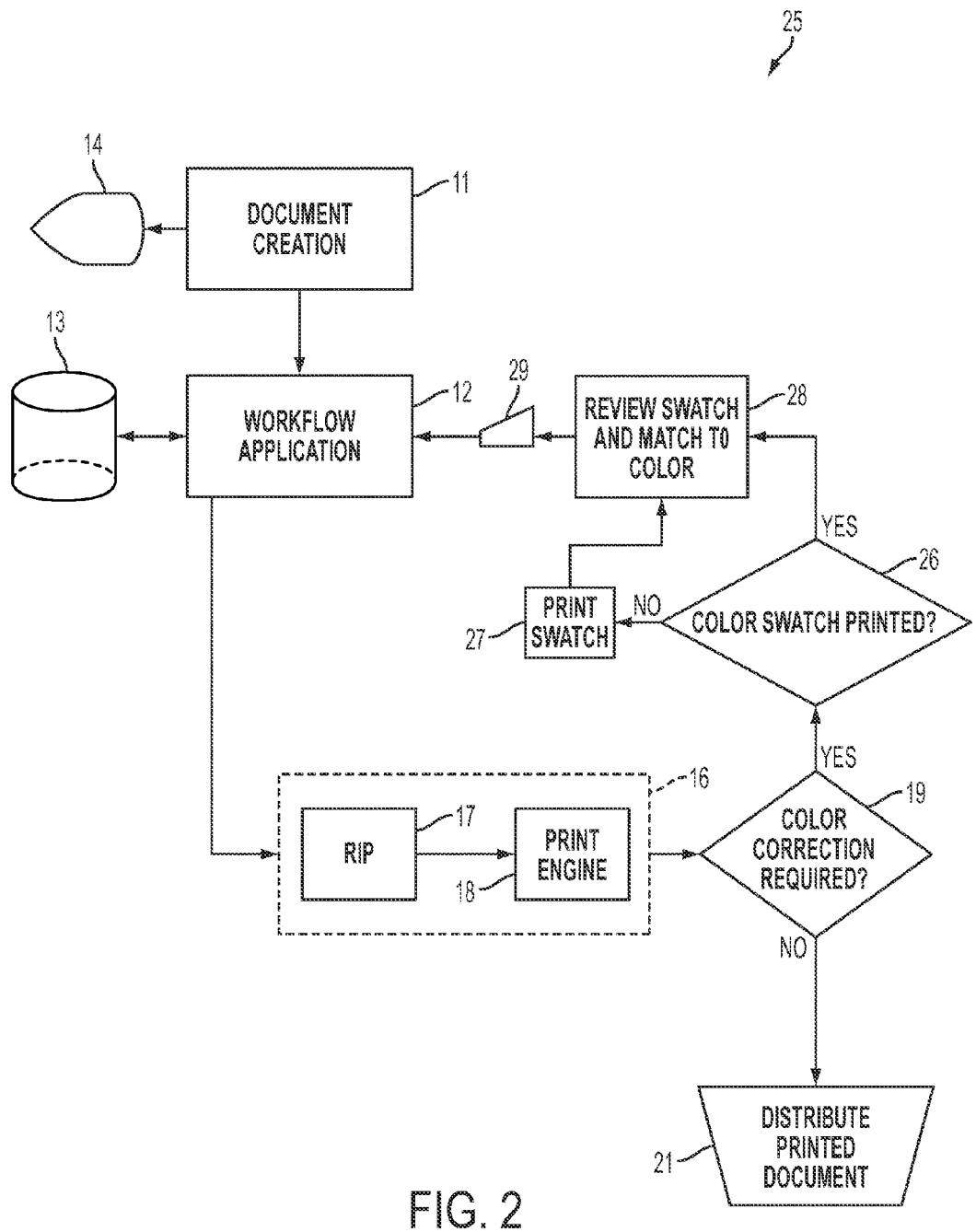
FIG. 2 is a process flow diagram of the overall invention process.

Referring now to FIG. 2, the invention 25 alters the prior art process by increasing the efficiency of the workflow editing process and removes any necessity for editing the document at the document creation point 11. The invention uses the workflow application 12 to make a test print of the document through print device 16 as in process 10. The user reviews the document to confirm that the color output of the document, such as a simulated spot color, is satisfactory 19. If a spot color has been replicated unsatisfactorily, the workflow application 12 identifies spot colors in the PDL file and produces a test "swatch page" of spot colors based upon a selected spot color 27. For the purposes of this disclosure, the term "swatch page" shall refer to the printed output of one or more test tiles or test color patterns that are color related to a selected color in a PDL file. A previously printed swatch page for a particular color may have already been printed, but if it has not 26, a swatch page is printed 27 thr the selected spot color in the PDL file. The swatch page is then reviewed and a preferred color shown on the swatch page is selected 28 by inputting 29 the desired color tile reference number shown below the tile 12. The printing of a plurality of swatch pages each associated with a different spot color in the PDL is accomplished through workflow application 12, so that multiple re-assignments of spot colors file may be achieved without interim test printing of the document for each color. After inputting each spot color re-assignment, the altered PDL file may then be submitted to a printing device 16 with a high probability of spot color satisfaction. Further discussion regarding the discovery and re-assignment of spot colors in the PDL file, and the creation of suitable swatch pages, is described in fuller detail below.

Figure 3:
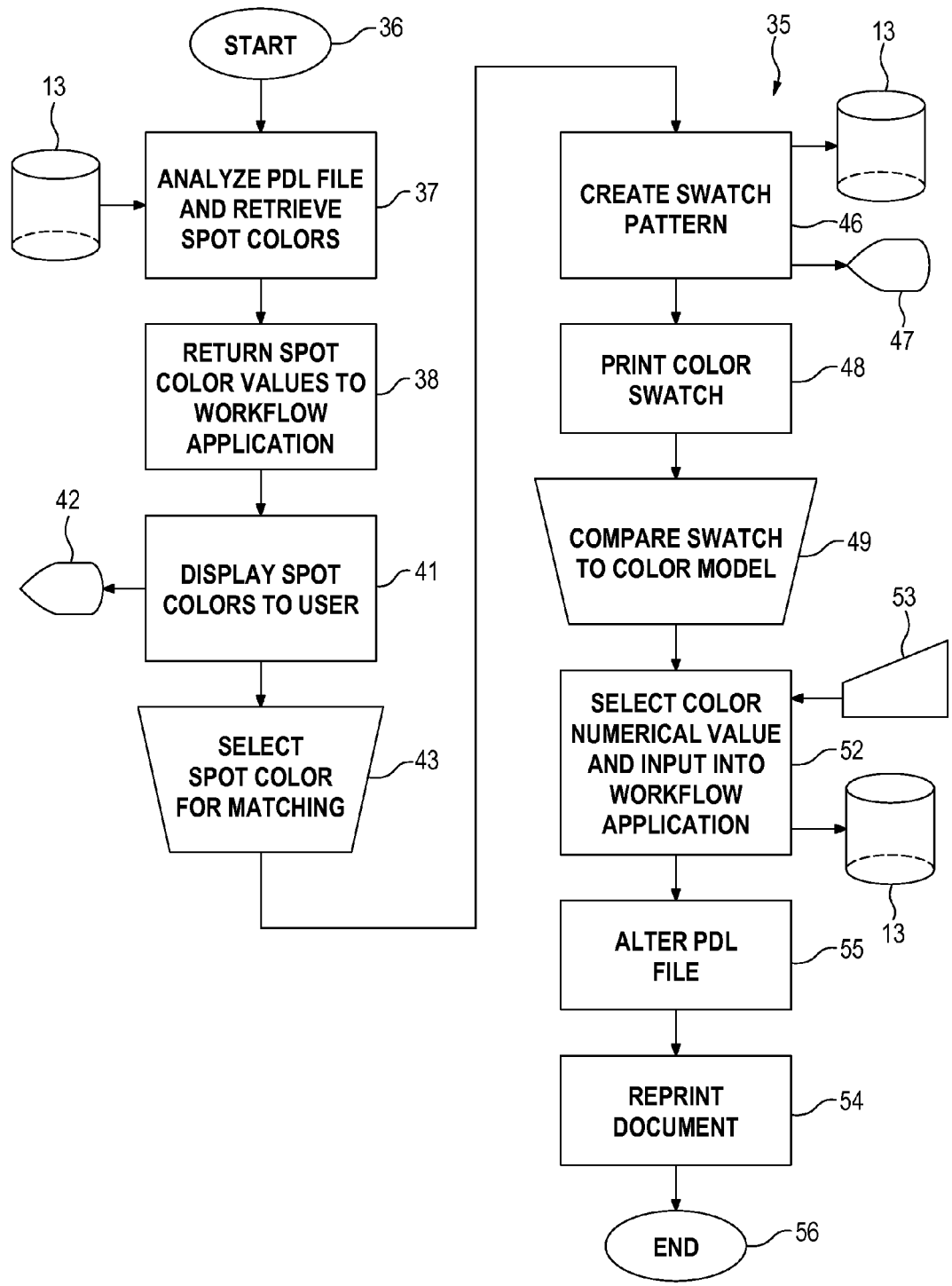
FIG. 3 is a process flow diagram of one aspect of the invention process.

FIG. 3 shows the implementation of process 25. A software module associated with or under the control of workflow application 12 analyzes a target PDL file retrieved from storage 13 to identify spot colors present in the file 37. The values of each spot color found in the PDL file are returned 38 and saved in a database in memory of the machine running the workflow application. Depending upon what language is used in the PDL file, various techniques may be utilized to accomplish steps 37 and 38. For example, if the PDL file language is PostScript, a routine shown in Table 1 below will return all spot color values in the PDL file by utilizing a configured PS interpreter (hereinafter "CPSI") such as available from Adobe with their PostScript 3 interpreter. PostScript 3 currently uses the following operators to control spot colors:

setcolor
    setcmykcolor
    setrgbcolor
    sethsbcolor
    setgray
    setpattern To determine the spot colors found inside the PS file, the file is modified to redefine these operators to convert the found spot colors into RGB format. The CPSI gathers this information by launching an embedded copy of an Adobe RIP. Each of the above listed operators redefines each spot color and reports the color to the CPSI. The listed routine collects the responses from the CPSI and parses the data into an organized set of discovered spot colors, labels each data string with the identifier "iQueue_RGB" so as to differentiate spot color related information from general PS response information, and saves the labeled set in storage 13. In this manner, spot color retrieval accuracy is assured because the embedded copy of the RIP functions in an identical manner to the RIP present in a printing device, and the PDL file therefore will be identically processed.

TABLE 1

```
/iQ_printRGB{
    currentrgbcolor(#iQ_RGB )print 0 1 2 (pop =string cvs print( )print}
    for(\n)print
}def
/setcolor{systemdict/setcolor get exec iQ_printRGB}def
/setcmykcolor{systemdict/setcmykcolor get exec iQ_printRGB}def
/setrgbeolor{systemdict/setrgbcolor get exec iQ_printRGB}def
/sethsbcolor{systemdict/setrgbcolor get exec iQ_printRGB}def
/setgray{systemdict/setgray get exec iQ_printRGB}def
/setpattern{systemdict/setpattern get exec iQ_printRGB}def
```

Once the spot colors are retrieved, each color is saved in an array and managed by the workflow application so that a swatch page can be produced on demand. The workflow application also maintains a matching array of target spot colors for each processed PostScript file. Each array creates an entry for each spot color targeted by the user for alteration in the form of an RGB tuple having the form [R G B]. For example, the flowing array entries show two shades of green targeted for re-assignment to two slightly lighter shades of green.

/*Queue_src [[0 127 0][0 130 0]]def
    /iQueue_dst [[0 143 0][0 146 0]]def

For each PS file processed an XML file and an array is generated, and each found spot color is labeled with the tag "<rightON>". Each spot color detected is represented by an RGB color value, with each RGB component separated by a comma, and each RGB color value separated with a semicolon. A mapping between a discovered spot color and replacement or "target" spot color is maintained in the array with each RGB value separated by a hyphen. For example, if three spot colors are detected in a PS file such as Red (RGB 255, 0,0), White (RGB 255,255,255), and Gray (RGB 128,128, 128), and this RGB color is replaced by a similar color in which the red and white color values are unchanged, but the gray color value is replaced by black, the mapping would appear in the XML file as follows:

<rightON>255,0,0;255,255,255;128,128,128-0,0,0</rightON>

Because no changes were made to the red or white colors in the above example, those entries are not Wowed by a hyphen.

Figure 4:
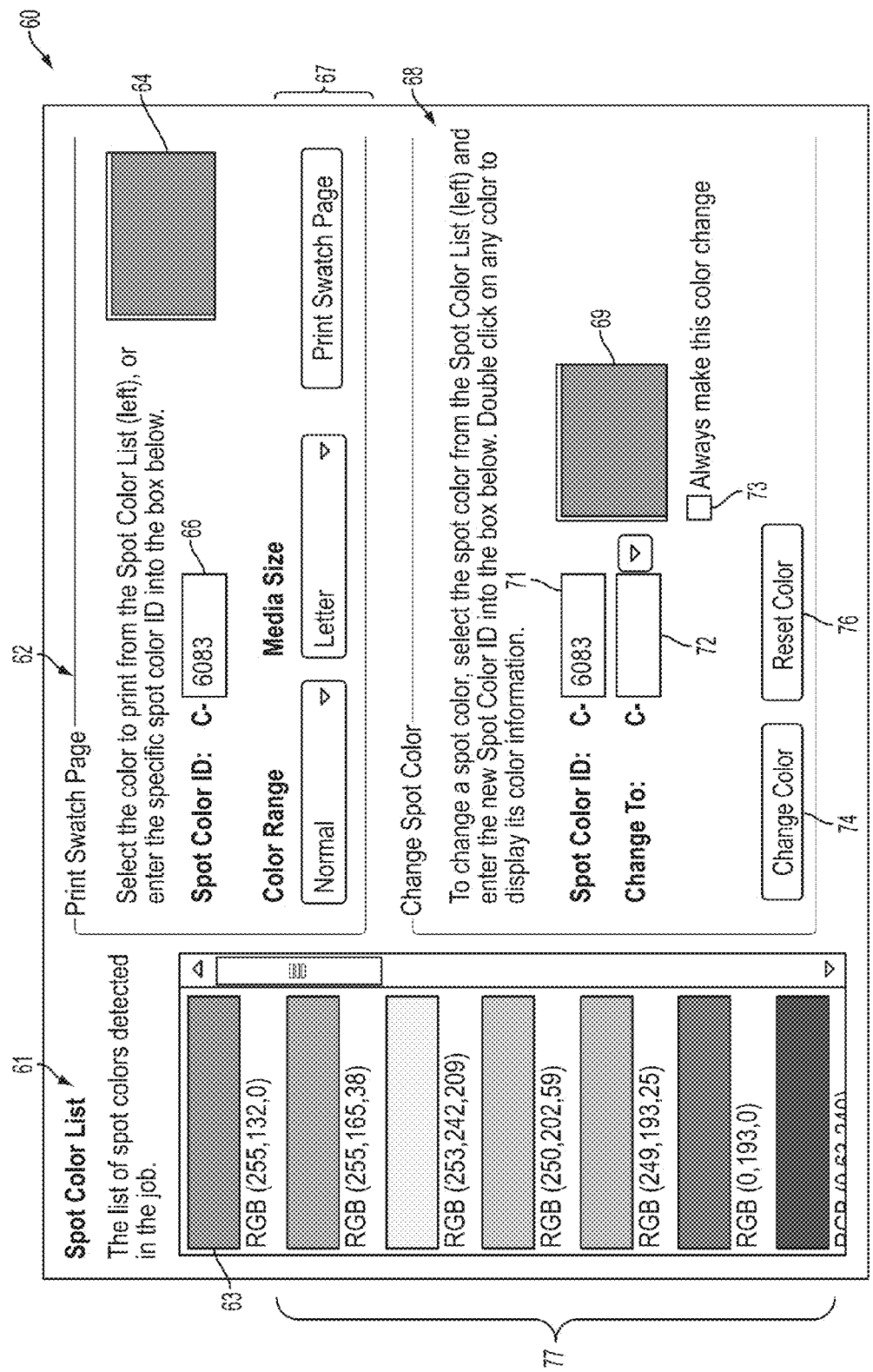
FIG. 4 is an example user interface control window for a portion of the invention process; and, FIG. 5 is an example printed swatch page showing a plurality of potential color tiles.

Now, referring to FIG. 4 in conjunction with FIG. 3 the user accesses a user interface screen 60 that displays the discovered spot colors 41, along with other selection options. The screen 60 displays the spot color list in a frame 61 with a scrollable list of discovered spot colors 77 with their applicable RGB color values. As a user selects an available spot color for matching 63 (step 43 in FIG. 3), responsive actions occur in a swatch print frame 62 and a spot color change selection frame 68. The user may then create a swatch page 46 based upon the selected color 63 shown in preview window 64, and after selecting various time ranges and media size options 67. Based on these selected options, a swatch pattern is created 46, saved 13, and printed 48.

FIG. 5 shows a representation of a printed swatch page 80 having a plurality of identically sized color tiles 81 in a table format. In this example, 7 tiles are arranged in the swatch page vertically 86, and three groups of five (88, 89, 91) color tiles are arranged horizontally 84. As shown, each color tile 81 includes a numerically assigned reference number 83 positioned below each tile the use of which will be discussed presently. As may be seen in color FIG. 5, the selected color 63 under inspection appears as a center tile 82 of the swatch page 80 with relatively subtle variations in saturation and hue spanning the dimensions of swatch page 80.

The default or "normal" setting of color tiles, printed on a swatch page is based upon the inventors' empirical study combined with the practicality of the number of color tiles that can comfortably fit on a letter or A4 sized sheet of output media. However, a user may print larger or smaller ranges by making changes in the selection fields 67 of the swatch page frame 62 as desired.

At the default or normal setting, a swatch page 80 displays 105 color tiles in a pattern of 3 groups (88, 89, 91) of 35 tiles, each having five columns and 7 rows. Each color tile 81 corresponds to a distinct color in "HSV," where H=Hue, S=Saturation, and V=Value. These variables have the following ranges and unit values:

H: 0 to 359 degrees.
    S: 0 to 100 percent
    V 0 to 100 percent

A difference variable "D" is assigned to each of the above described available swatch tile sizes range—8 in a Normal setting; 4 in a Fine setting, and 12 in a Wide setting. This difference variable is applied to the total number of color tiles to be created so that each section ends up with a specified range of color tiles.

With sections representing differences in H, columns representing differences in S, and rows representing differences in V, the product H*S*V equals a selected spot color value. The value for H for any color tile 81 on the swatch page is derived as follows:

Left section (88): H→D
Center section (89): H
Right section (91): H+D So, for example, if the target spot color has a hue of 44, and the difference constant "D" is 4 results from a "Fine" setting, the left section 88 color tiles will have hue values of 40, and the right section 91 color tiles will have hue values of 48. The values for S will differ for each column on the swatch page 80 and may be derived as follows:

Column 1: S−2D
Column 2: S−D
Column 3: S
Column 4: S+D
Column 5: S+2D

Values for V differ for each row and May be derived for each color tile as follows:

Row 1: V−3D
Row 2: V−2D
Row 3: V−D
Row 4: V
Row 5: V+D
Row 6: V+2D
Row 7: V+3D

As may be understood, the center color tile 82 (column 3, row 4) in the center section 89 has the value HSV, which is the spot color 63 for which a swatch page was generated. If a computed value for H, S, or V is out of range, the following adjustments are made:

If H is less than 0, 360 is added to H.
If H is greater than 359, 360 is subtracted from H.
If S is less than 0, S is assigned the value 0.
If S is greater than 100, S is assigned the value 100.
If V is less than 0, V is assigned the value 0.
If V is greater than 100, V is assigned the value 100.

These adjustments may result in duplicate color tiles, but that selection criteria is preferred to leaving a blank color tile space 81 on the swatch page 80.

As may be seen, each color tile 81 includes an assigned numerical value 83. Each of these values is based upon an assigned HSV value which is mathematically related to each other. The potential range of any numerically assigned value to a color tile is a number between 0 and 60,839, which is an arbitrarily assigned range, but which has been determined by the inventors to be a preferred scale based on experience. This range allows for 90 different values for "hue," and 26 different values for "saturation," and 26 different values for "value." Each value for hue, saturation, and value is a multiple of 4. So, any given color the reference number may be determined from its assigned HSV value in accordance with the following formula:

$$\text{Reference Number} = ((H/4)*676) + ((S/4)*26) + (V/4)$$

Referring once again to FIG. 3 and FIG. 4, after a color swatch page has been printed 48 the user compares the swatch page to a color model on hand from a prior successful print job of the spot color under scrutiny 49, and selects a presented color tile most closely approximating the color model. Assuming that selected color tile is different from the original spot color tile 82, the numerical value of the selected color tile is input (step 53 of FIG. 3) into field 72 of frame 68 in screen 60 (step 52 in FIG. 3), and saved in database 13 by selecting the change color selection tab 74, and confirmed by a change in preview window 69 to match the new color. Once all spot colors have been checked against their respective printed swatches and altered to suit, the document may be reprinted a second time 54 with a high confidence of satisfactory results.

In order for the color changes to be implemented when printed, several changes to the PS file must be made in order that the RIP properly reproduces the newly selected colors. The PostScript routine shown previously in Table 1 accomplishes this by overriding default variable settings in the PS file. As described previously, the workflow application 12 maintains an array of detected spot colors in RGB format, along with the replacement RGB values. During the swatch page generation process (step 46 in FIG. 3), each color is identified by its assigned color tile reference number, which results from its RGB color value being converted into an HSV value, using known algorithms such as a Foley and VanDam conversion approach, and then into a color tile reference number as described above. Workflow application 12 overrides the following PostScript operators used to render items that contain spot colors:

/show
/ashow
/widthshow
/awidthshow
/xshow
/yshow
/glyphshow
/cshow
/kshow
/stroke
/eofill
/rectstroke
/rectfill
/ustroke
/ufill
/ueofill As described previously, the workflow program 12 maintains two arrays in an XML file that records spot color changes in terms of a source sport color and a destination (or target) spot color with the tag names "iQ_srcRightON" and "iQ_destRightON." However, those changes must be written into the PS file to implement the changes recorded in the XML file. For example, if a source spot color is converted from black (RGB 0,0,0) and gray (RGB 128,128,128) into white (RGB 255,255,255), the following PS definitions would be valid:

/iQ_srcRightON [[0 0 0][128 128 128] def
/iQ_destRightON [[225 225 225][255 255 255]]def Using these PS definitions, it is simply a matter of mapping a source spot color to a destination spot color. A PS routine that accomplishes this is shown below in Table 2. Any spot color in the PS file that has no /iQ_srcRightON definition will remain unchanged in the mapping.

TABLE 2

```
/iQ_ColorTransform {
    /iQ_RGB [[currentrgbcolor]{ 255 mul cvi}forall] def
    iQ_srcRightON length 0 gt {
        0 1 iQ_srcRightON length 1 sub {
            /iQ_i exch def
            iQ_srcRightON iQ_i get
            iQ_RGB
            iQ_RGBComp {
                iQ_destRightON iQ_i get
                [exch{ 255 div} forall]aload pop
                systemdict/setrgbcolor get exec
            } if
        } for
    } if
}
```

A PostScript procedure, shown below, is then executed to compare an RGB tuple found in the PS file to a source RGB tuple. This is necessary to determine whether a spot color found in the PS file needs to be converted.

/iQueue_RGBComp{
aload pop 4-1 roll aload pop
4-1 roll eq 5 1 roll 3-1 roll eq 4 1 roll eq and
} def The previously listed six PostScript 3 operators (setcolor, setcmykcolor, setrgbcolor, sethsbcolor, setgray, setpattern) are also overridden so that the workflow application may re-assign spot colors found in the PS file into a new spot color. Table 3 below shows a satisfactory routine to accomplish this.

TABLE 3

/setcolor {
  systemdict/setcolor get exec
  iQueue_checkColor
} def
/setcmykcolor {
  systemdict/setcmykcolor get exec
  iQueue_checkColor
} def
/setrgbcolor {
  systemdict/setrgbcolor get exec
  iQueue_checkColor
} def
/sethsbcolor {
  systemdict/sethsbcolor get exec
  iQueue_checkColor
} def
/setgray {
  systemdict/setgray get exec
  iQueue_checkColor
} def
/setpattern {
  systemdict/setpattern get exec
  iQueue_checkColor
} def The workflow application converts the existing or source PS file into a revised or edited PS file to re-assign spot colors and sets the Postscript transfer function to NULL so that no alteration to the color re-assignment will occur when processed by the RIP. A suitable routine to accomplish this re-assignment ent alteration to the PS file is shown in Table 4. This routine also sets the transfer function to "NULL."

TABLE 4

/iQueue_checkColor {
  /iQueue_RET false def
  % Get RGB and convert to an array of [0..255] values.
  [[currentrgbcolor]{=string cvs cvr 255 mul cvi}forall] /iQueue_RGB exch def
  iQueue_src length 0 gt {
  0 1 iQueue_src length 1 sub {
  /iQueue_i exch def
  iQueue_src iQueue_i get
  iQueue_RGB
  iQueue_RGBComp {
  iQueue_colorSpace null eq {userdict/iQueue_colorSpace currentcolorspace
put} if
  iQueue_dst iQueue_i get
    dup length 3 eq {
  [exch{ 255 div}forall]aload pop
  systemdict/setrgbcolor get exec
}{
  [exch{ 255 div}forall]aload pop
  systemdict/setcmykcolor get exec
}ifelse
/iQueue_REF true def
}{

TABLE 4-continued userdict/iQueue_colorSpace null put
} ifelse
} for
} if
iQueue_RET {
  iQueueHalftone/HTFlat get sethalftone
}{
  iQueueHalftone/HT get sethalftone
} ifelse
} def Finally, two additional PostScript operators are redefined: "image" and "colorimage." This is necessary to re-establish any PostScript transfer functions that were in effect before a source spot color was converted to a target color. Table 5 below shows a suitable routine to redefine these operators.

TABLE 5

/image {
  iQueueHalftone/HT get sethalftone
  systemdict/image get exec
} def
/colorimage {
  iQueueHalftone/HT get sethalftone
  systemdict/colorimage get exec
} def While the above example for the invention was shown in relation to PostScript file processing, a PCL file can similarly be accomplished, albeit with a different instruction processing in the file because it is a different print language.

Replacing spot colors in a PCL file requires scanning the PCL file directly to determine which spot colors are present, rather than use the CPSI to interrogate or manipulate the file as in PS. This is required because a CPSI function does not exist for the PCL file language as in PostScript, but it does allow for a somewhat simpler implementation of the herein described system.

Spot colors in a PCL file are implemented through the use of "color palettes." When referring to a spot color, a PCL file simply refers to a listing in its color palette index. To discover what spot colors are present, the workflow application detects and manipulates the PCL color palettes directly in the PCL file to achieve the desired spot color transformations. This is accomplished by parsing the source PCL file and modifying the palettes.

The PCL language uses the following commands to program a color palette:

<ESC>*v#A, where # is the value of the Red component.
  <ESC>*v#B, where # is the value of the Green component.
  <ESC>*v#C, where # is the value of the Blue component.
  <ESC>*v#I, where # is the index number (which assigns the RGB value in the first three PCL commands to a specified index)

The workflow application searches the PCL file to find the first three PCL commands that are used to set up spot colors. If the application encounters an RGB spot color in the PCL file that requires a spot color transformation, the application modifies each of the above command values into transformed spot color values.

While the inventors have shown the invention in one form, it will be obvious to those skilled in the art that it is not so limited but is susceptible of various changes and modifications without departing from the spirit thereof. For example, while the inventors have chosen HSV as the preferred color space in which to define spot color characteristics, other spaces such as RGB, CMYK, HSB, etc. may be utilized with comparable results.

Having set forth the nature of the invention, what is claimed is:

1. In a workflow printing topology in which a workflow software application transfers a page description based document file to a printer having a raster image processor and a print engine, a method for improving spot color reproduction in a printed color document comprising the steps of:
   a. printing a draft test document and determining whether color spot correction is necessary;
   b. if color correction is necessary, printing a color swatch page for each spot color requiring correction, wherein each swatch page includes a plurality of color tiles;
   c. assigning a unique numerical value to each said color tile such that said numerical value may be used to calculate a substantially equivalent color value in a color space different from the color space in which the color tile was created;
   d. selecting a color tile for each spot color that most closely matches a desired printed rendition of said spot color;
   e. inputting said unique numerical value associated with each selected color tile into said workflow software application; and,
   f. altering said page description document file to record changes for each spot color altered in said color tile selection step.

2. The method according to claim 1, further including the steps of:
   a. analyzing said page description document file and retrieving all spot colors in said file;
   b. displaying each found spot color in a user display; and,
   c. selecting one or more spot colors from said user display to generate a swatch page for said selected spot color.

3. The method according to claim 2, wherein said step of printing a color swatch page comprises the steps of:
   a. receiving instructions from a user to print a swatch page for a selected spot color;
   b. creating a swatch pattern associated with said selected spot color comprising a rectangular table of color tiles similar to said spot color, wherein said selected spot color appears at the center of said rectangular table and surrounding tiles are each positioned in a row and column that intersects another row or column in the rectangular table at a perpendicular angle;
   c. assigning a visible identifier to each color tile; and,
   d. printing said swatch page.

4. The method according to claim 3, wherein said step of printing a color swatch page further comprises the steps of:
   a. establishing numerical row and column tile dimensions for said swatch page;
   b. establishing a difference constant between each said color tile; and,
   c. assigning color characteristics for each said color tile responsive to said difference constant such that said table displays a varying two dimensional mosaic of said color tiles across said table in relatively close color relation to said selected spot color.

5. The method according to claim 1, wherein said step of creating a swatch patter further produces a table of swatch tiles in a non-axial orientation.

6. The method according to claim 4, further including the step of creating two mapped arrays in which a color space value for an original spot color is recorded in a first array and mapped to a replacement spot color in a second array.

7. The method according to claim 6, wherein each said array in said step of creating mapped arrays utilizes n-tuples to record each color value.

8. The method according to claim 4, wherein said step of analyzing said page description document file and retrieving all spot colors in said file comprises using an interpreter to return all know spot color values in said page description document file.

9. The method according to claim 8, further including the step of separating said color tiles in said swatch page into three groups of identical quantities of color tiles.

10. The method according to claim 9, further including the step of positioning a color tile of identical color space value to said original spot color for which the color swatch page is being created at the center of said table of said color swatch page.

11. The method according to claim 4, wherein said step of analyzing said page description document file and retrieving all spot colors in said file comprises searching for a known color space description string, and wherein said step of altering said page description document file to record changes for each spot color altered in said color tile selection step comprises searching and replacing a known color space description string.

12. The method according to claim 11, further including the step of separating said color tiles in said swatch page into three groups of identical quantities of color tiles.

13. The method according to claim 1, wherein said step of printing a color swatch page comprises the steps of:
   a. receiving instructions from a user to print a swatch page for a selected spot color;
   b. creating a rectangular swatch pattern associated with said selected spot color comprising a rectangular table of color tiles similar to said spot color;
   c. assigning a visible identifier to each color tile; and,
   d. printing said swatch page.

14. The method according to claim 1, wherein said step of printing a color swatch page comprises the step of printing a rectangular array of color tiles wherein said identified spot color appears in said array and includes similar color tiles each positioned in rows and columns that intersect each other row and column of color tiles in said rectangular array at a perpendicular angle.

15. The method according to claim 1, wherein said step of printing a color swatch page further comprises the steps of:
   a. establishing numerical row and column tile dimensions for said swatch page;
   b. establishing a difference constant between each said color tile; and,
   c. assigning color characteristics for each said color tile responsive to said difference constant such that said swatch page displays a varying two dimensional mosaic of said color tiles across said swatch page in relatively close color relation to said selected spot color.

16. The method according to claim 15, further comprising the step of assigning a unique numerical value to each color tile and inputting said numerical value into said workflow software application to cause the replacement of said spot color to be replaced in said page description document file.

17. In a workflow printing environment, a method for improving spot color reproduction in a printed color document comprising the steps of:
   a. identifying spot colors in a page description document file having unsatisfactory process print color when output to a printing device;
   b. printing a color swatch page for each said identified spot color that a user determines is unsatisfactory, wherein said swatch page displays a rectangular array of color tiles wherein said identified spot color appears in said array and includes similar color tiles each positioned in rows and columns that intersect other rows and columns of color tiles in said rectangular array at a perpendicular angle, and wherein each color tile includes a human identifiable numerical value associated therewith;

c. selecting one of said numerical values and inputting said value into a workflow printing application to cause a replacement of each said original spot colors with a color represented by said inputted numerical value; and, d. printing said page description document file to confirm color satisfaction.

18. The method according to claim 17, wherein said step of printing a color swatch page comprises the steps of:
   a. a user reviewing a swatch page menu screen that presents a listing of spot colors found in said page description document file;
   b. said user selecting one of said presented spot colors for replacement;
   c. assigning a unique numerical value to each said color tile such that said numerical value is used to calculate a substantially equivalent color value in a color space different from the color space in which the color tile was displayed; and,
   d. said user causing printing of said swatch page.

19. The method according to claim 18, wherein said step of printing a color swatch page further comprises the steps of:
   a. establishing numerical row and column tile dimensions for said swatch page;
   b. establishing a difference constant between each said color tile; and,
   c. assigning color characteristics for each said color tile responsive to said difference constant such that said swatch page displays a varying two dimensional mosaic of said color tiles across said swatch page in relatively close color relation to said selected spot color.

20. The method according to claim 19, further comprising the step of assigning a unique numerical value to each color tile such that said numerical value may be used to calculate a substantially equivalent color value in a color space different from the color space in which the color tile was created.

21. The method according to claim 17, further including the steps of:
   a. analyzing said page description document file and retrieving all spot colors in said file;
   b. displaying each found spot color in a user display; and,
   c. selecting one or more spot colors from said user display to generate a swatch page for said selected spot color.

22. The method according to claim 21, wherein said step of printing a color swatch page further comprises the steps of:
   a. establishing numerical row and column tile dimensions for said swatch page;
   b. establishing a difference constant between each said color tile; and,
   c. assigning color characteristics for each said color tile responsive to said difference constant such that said swatch page displays a varying two dimensional mosaic of said color tiles across said swatch page in relatively close color relation to said selected spot color.

23. A system for correcting spot color simulation in a process color printing device, comprising:
   a. means for identifying spot colors in a page description document file;
   b. means for printing a color swatch page for each identified spot color that a user determines is unsatisfactory when printed with a process printing device, wherein said swatch printing means causes the printing of a plurality of color tiles related to but different from said each identified spot color, and wherein each color tile displays a human identifiable numerical value associated therewith; and,
   c. means for altering said page description document file by accepting said numerical value associated with a replacement color for said spot color from user, wherein said altering means causes said page description document file to print a substantially equivalent color value in a color space different from the color space in which said replacement color was created.

24. The system according to claim 23, further including:
   a. means for analyzing said page description document file and retrieving all spot colors in said file;
   b. means for presenting each found spot color in a user display; and,
   c. means for selecting one or more spot colors from said user display and generating a swatch page for said selected spot color.

25. The system according to claim 24, wherein said means for printing a color swatch page further comprises:
   a. means for creating a swatch pattern associated with said selected spot color comprising a rectangular table of color tiles similar to said spot color; and,
   b. means for assigning a visible identifier to each color tile.

26. The system according to claim 25, wherein said means for printing a color swatch page further comprises:
   a. means for establishing numerical row and column tile dimensions for said swatch page, wherein each said row and column intersect one another at a perpendicular angle;
   b. means for establishing a difference constant between each said color tile; and,
   c. means for assigning color characteristics for each said color tile responsive to said difference constant such that said table displays a varying two dimensional mosaic of said color tiles across said table in relatively close color relation to said selected spot color.

27. In a workflow printing topology in which a workflow software application transfers a page description based document file to a printer having a raster image processor and a print engine, a method for improving spot color reproduction in a printed color document comprising the steps of:
   a. printing a draft test document and determining whether color spot correction is necessary:
   b. if color correction is necessary, printing a color swatch page for each spot color requiring correction, wherein each swatch page includes a plurality of color tiles;
   c. selecting a color tile for each spot color that most closely matches a desired printed rendition of said spot color;
   d. inputting information associated with each selected color tile into said workflow software application; and,
   e. altering said page description document file to record changes for each spot color altered in said color tile selection step.

28. The method according to claim 27, further including the steps of:
   a. analyzing said page description document file and retrieving all spot colors in said file;
   b. displaying each found spot color in a user display; and,
   c. selecting one or more spot colors from said user display to generate a swatch page for said selected spot color.

29. In a workflow printing environment, a method for improving spot color reproduction in a printed color document comprising the steps of:

a. identifying spot colors in a page description document file having unsatisfactory process print color when output to a printing device;

b. printing a color swatch page for each said identified spot color that a user determines is unsatisfactory, wherein said swatch page displays a plurality of color tiles having colors related to but different from said each identified spot color, and wherein each color tile includes a human identifiable numerical value associated therewith;

c. selecting one of said numerical values and inputting said value into a workflow printing application to cause a replacement of each said original spot colors with a color represented by said inputted numerical value; and, d. printing said page description document file to confirm color satisfaction.

30. The method according to clam 29, wherein said step of printing a color swatch page comprises the steps of:

a. a user reviewing a swatch page menu screen that presents a listing of spot colors found in said page description document file;

b. said user selecting one of said presented spot colors for replacement; and, c. said user causing printing of said swatch page.

* * * * *